United States Patent
Yu et al.

(10) Patent No.: US 6,944,701 B2
(45) Date of Patent: Sep. 13, 2005

(54) PORTABLE USB DEVICE BUILT WITH RECHARGEABLE FUNCTIONAL APPARATUS

(75) Inventors: Gordon Yu, Taipei (TW); Jung Ta Chang, Hsinchu (TW); Forli Wen, Hsinchu (TW)

(73) Assignees: C-One Technology Corporation, Hsin-Chu (TW); Pretec Electronics Corporation, Fremont, CA (US)

( * ) Notice: Subject to any disclaimer, the term of this patent is extended or adjusted under 35 U.S.C. 154(b) by 298 days.

(21) Appl. No.: 10/357,367

(22) Filed: Feb. 4, 2003

(65) Prior Publication Data

US 2004/0078505 A1 Apr. 22, 2004

(30) Foreign Application Priority Data

Oct. 21, 2002 (TW) ...................... 91216780 U

(51) Int. Cl.[7] ............................. G06F 13/00; G06F 1/26
(52) U.S. Cl. ....................................... 710/300; 713/300
(58) Field of Search ............................... 713/300, 310, 713/320; 710/1, 62–63, 72, 300; 709/238; 702/122; 320/137; 340/825.72; 348/734

(56) References Cited

U.S. PATENT DOCUMENTS

| | | | |
|---|---|---|---|
| 6,357,011 B2 * | 3/2002 | Gilbert | ....................... 713/300 |
| 6,614,206 B1 * | 9/2003 | Wong et al. | ................. 320/136 |
| 6,636,158 B1 * | 10/2003 | Bando et al. | .......... 340/825.49 |
| 6,665,801 B1 * | 12/2003 | Weiss | ......................... 713/300 |
| 6,678,535 B1 * | 1/2004 | Narayanaswami | .......... 455/557 |
| 6,774,604 B2 * | 8/2004 | Matsuda et al. | ............ 320/110 |

OTHER PUBLICATIONS

"Hand held imaging spectrometer" by Hinnrichs, M. (abstract only) Publication Date: Oct. 16–17, 2002.*

"The Earth is mobile–power" by Efland, T.R. (abstract only) Publication Date: Apr. 14–17, 2003.*

* cited by examiner

Primary Examiner—Gopal C. Ray
(74) Attorney, Agent, or Firm—Bacon & Thomas, PLLC

(57) ABSTRACT

A portable USB device built with rechargeable functional apparatus is disclosed. The portable USB device has a USB connector for being inserted into a socket of a host device. A USB device module is powered by the +5V pin on the USB connector and activated to perform data exchange via the D+ and D– pins on the USB connector when the USB connector is coupled to the host device, so as to provide a first specific function to the host device. A charge circuit charges the rechargeable battery via the +5V pin when the USB connector is coupled to the host device. A functional apparatus is powered by the rechargeable battery so as to provide second specific function different from the first one when the USB connector is not coupled to the host device.

3 Claims, 3 Drawing Sheets

PORTABLE USB DEVICE BUILT WITH RECHARGEABLE FUNCTIONAL APPARATUS

BACKGROUND OF THE INVENTION

1. Field of the Invention

The present invention relates to a portable USB (universal serial bus) devices and, more particularly, to such a portable USB device built with a rechargeable functional apparatus.

2. Description of Related Art

Over the past several decades there has been a considerable growth in electronics. The trend of electronic products is compact, portable, low power, and/or multifunctional in order to bring a great convenience to vast consumers. The electronic products comprise, for example, USB card reader, USB wireless device, and portable USB hard disk, and all of which are portable. In using these electronic devices, the user simply inserts the portable USB hard disk in an USB socket of a personal computer, notebook computer, PDA (personal digital assistant) or digital camera for reading data therefrom, writing data into the portable USB hard disk, or for wireless transmission. Typically, the portable USB hard disk has a size about a thumb with a storage capacity of up to hundreds of MB. Typically, the memory of the portable USB hard disk is implemented as a flash memory. In the case that a USB connector of the portable USB hard disk is coupled to the USB socket of the associated device, power may be fed from the device to the portable USB hard disk via a power pin (+5V) of the USB connector for maintaining a normal operation of the flash memory. Furthermore, data stored in the flash memory can be accessed via data pins (D+ and D−) of the USB connector. In other words, the flash memory operates as a hard disk of a conventional computer.

As stated above, the USB hard disk has advantages of portability, compactness, being easy to use as a hard disk. Thus, continuing improvements in the portable USB hard disk are constantly being sought.

SUMMARY OF THE INVENTION

An object of the present invention is to provide a portable USB device built with rechargeable functional apparatus for enhancing the functionality.

To achieve the object, the portable USB device of the present invention comprises: a USB connector having +5V, D+, and D− pins for being inserted into a socket of a host device; a USB device module powered by the +5V pin and activated to perform data exchange via the D+ and D− pins when the USB connector is coupled to the host device, so as to provide a first specific function to the host device; a rechargeable battery; a charge circuit for charging the rechargeable battery via the +5V pin when the USB connector is coupled to the host device; and a functional apparatus powered by the rechargeable battery so as to provide second or more specific functions different from the first one when the USB connector is not coupled to the host device.

Other objects, advantages, and novel features of the invention will become more apparent from the detailed description when taken in conjunction with the accompanying drawings.

DETAILED DESCRIPTION OF THE PREFERRED EMBODIMENT

Figure 1:
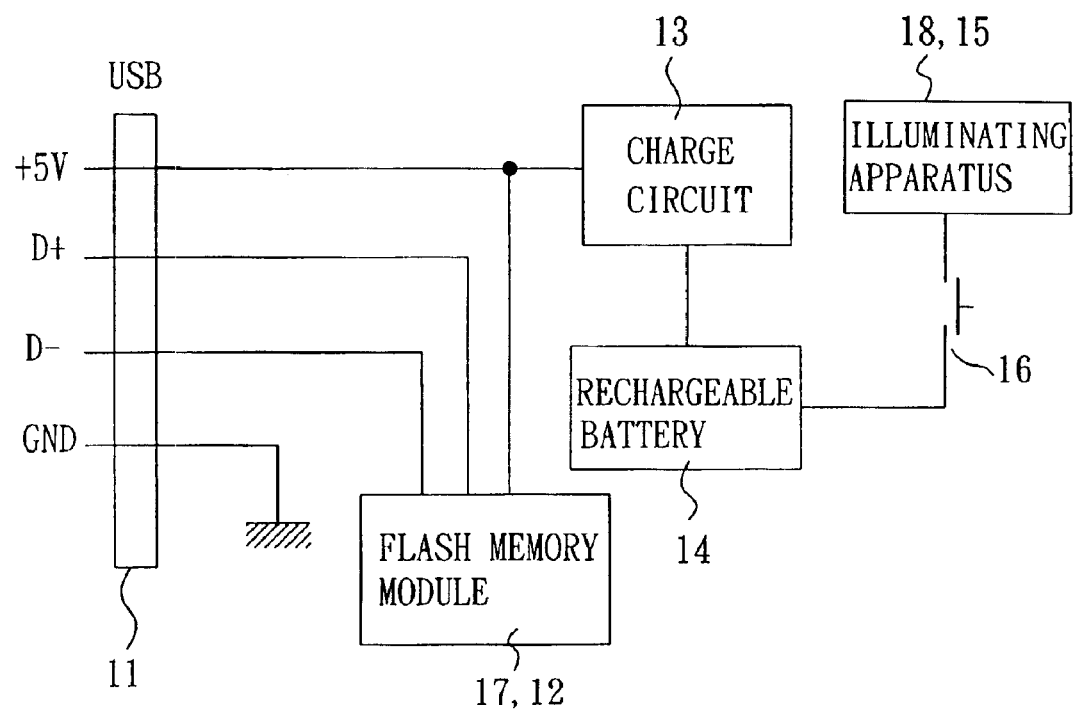
FIG. 1 is a block diagram of circuitry of a portable USB device according to the invention.

With reference to FIG. 1, there is shown the circuit blocks of a portable USB device built with rechargeable functional apparatus in accordance with the invention, which comprises a USB connector 11, a USB device module 17, a charge circuit 13, a rechargeable battery 14, a functional apparatus 18, and a push button 16. The portable USB device may be a USB card reader, a USB wireless device, or portable USB hard disk. In this embodiment, a portable USB device built with a rechargeable illuminating apparatus is provided, and thus the USB device module 17 is a flash memory module 12 and the functional apparatus is an illuminating apparatus 15. The USB connector 11 can be inserted into a USB socket of a host device (not shown). As such, power may be fed from the host device to the portable USB hard disk via a power pin (+5V) of the USB connector 11 for maintaining a normal operation of the flash memory module 12. Furthermore, data in the flash memory 12 may be accessed via data pins (D+ and D−) of the USB connector 11, so as to provide the data storage function of a hard disk.

In accordance with the specification of USB 1.* or 2.0, the rated current of the +5V pin is 500 mA. In an implementation, the rated current is more than 500 mA due to the consideration of the circuitry design of the circuit board (such as ferrite bead). However, the operating current of the flash memory module 12 is typically lower than 100 mA. As such, the current can be supplied to the charge circuit 13 via the +5 V pin for charging the rechargeable battery 14 in addition to supplying the flash memory module 12 without adversely affecting a normal data reading/writing operation of the flash memory module 12.

Figure 2:
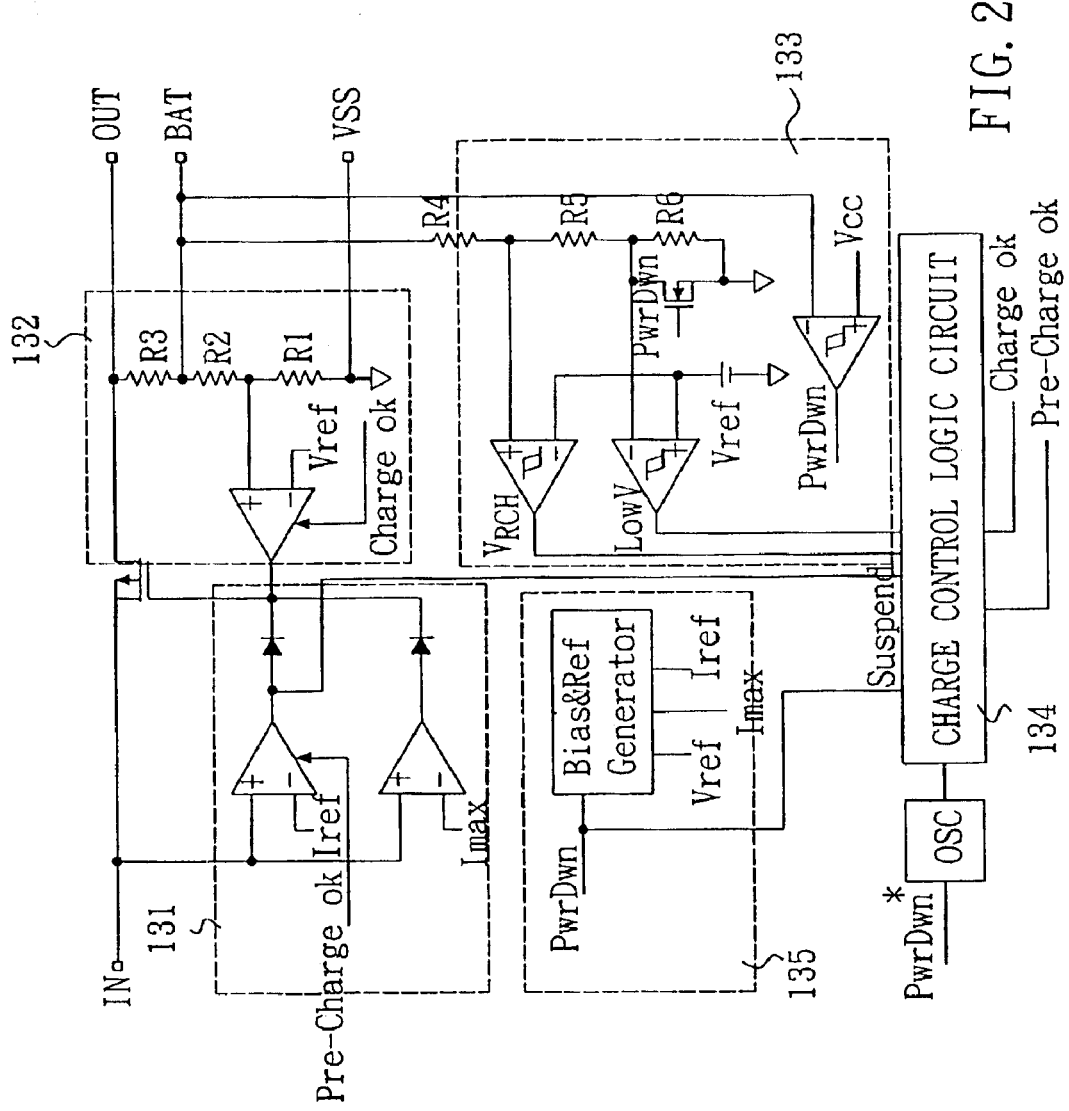
FIG. 2 is a detailed circuit diagram of the charge circuit shown in FIG. 1.

With reference to FIG. 2, the charge circuit 13 comprises a charge waveform control circuit 131, a comparison circuit 132, a battery level detection circuit 133, a charge control logic circuit 134, and a bias and reference voltage generation circuit 135. In a case that the portable USB device is coupled to the host device, power may be supplied to the rechargeable battery 14 (i.e., charging) via the +5 V pin as commanded by the charge waveform control circuit 131 when a voltage of the rechargeable battery 14 detected by the battery level detection circuit 133 is lower than a predetermined voltage generated by the bias and reference voltage generation circuit 135. The charging automatically stops when a charge voltage of the rechargeable battery 14 has risen to be equal to the predetermined voltage as compared by the comparison circuit 132.

The charge circuit 13 is formed on an IC (integrated circuit) chip with a current consumption less than 50 mA. Power output of the rechargeable battery 14 is smaller than 1 W. Preferably, the rechargeable battery 14 is implemented as a lithium cell having a rated voltage of 3.6 V and a charge current about 56 to 280 mA. Hence, the charge circuit 13 may charge the rechargeable battery 14 without adversely affecting a data reading/writing operation of the flash memory module 12. In a case that the USB connector 11 of the portable USB hard disk built with an illuminating apparatus is inserted into the socket of the host device for reading data from the host device or writing data into the portable USB hard disk, the rechargeable battery 14 can be charged until full if the voltage of the rechargeable battery 14 is low. Once the voltage of the rechargeable battery 14 is full, the portable USB hard disk can be used as an illuminating device when it is not coupled to the host device.

Figure 3:
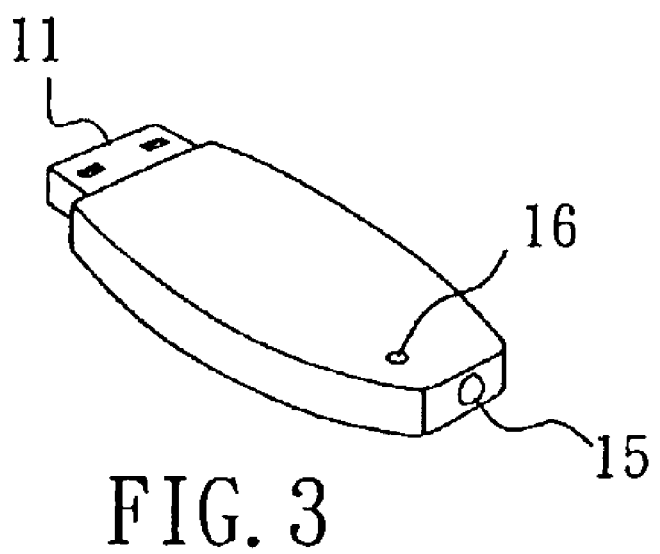
FIG. 3 is a perspective view of the FIG. 1 USB device implemented as a portable USB hard disk.

With reference to FIG. 1 again, the rechargeable battery 14 is activated to supply power to the illuminating apparatus 15 by pressing the push button 16. Preferably, the illuminating apparatus 15 is a LED (light-emitting diode) or a low power illuminator. As shown in the perspective view of FIG. 3, the LED is disposed at one end of the portable USB hard disk and the push button 16 is located adjacent the LED 15. In use, the user can simply press the push button 16 for activating the LED to illuminate.

In view of the foregoing, it is known that the present invention provides a functional apparatus 18 powered by the rechargeable battery 14 in a portable USB device, so that the portable USB device still has a specific function even though it is not inserted in a host device and carried by the user. Furthermore, there is no additional charge connector required on the portable USB device since charge capability is incorporated in the USB connector 11. In addition, the functional apparatus 18 may be implemented as a laser emitting circuit, alarming circuit, or remote control circuit other than the above mentioned illuminating apparatus 15. As such, the portable USB device can be functioned as a laser pointer, an alarm device, or a remote control.

Although the present invention has been explained in relation to its preferred embodiment, it is to be understood that many other possible modifications and variations can be made without departing from the spirit and scope of the invention as hereinafter claimed.

What is claimed is:

1. A portable USB device with a rechargeable functional apparatus, comprising:

a USB connector having +5V, D+, and D− pins for being inserted into a socket of a host device;

a USB device module powered by the +5V pin and activated to perform data exchange via the D+ and D− pins when the USB connector is coupled to the host device, so as to provide a first specific function to the host device;

a rechargeable battery;

a charge circuit for charging the rechargeable battery via the +5V pin when the USB connector is coupled to the host device; and a functional apparatus powered by the rechargeable battery so as to provide a second specific function different from first specific function when the USB connector is not coupled to the host device, wherein the first specific function is an I/O function, and the USB device module provides the I/O function and data storage space, so that, when the USB connector is coupled to the host device, the USB device module is powered via the +5V pin and controlled via the D+ and D− pins to achieve the I/O function and data exchange, and wherein the functional apparatus is an illuminating apparatus, and the illuminating apparatus further comprises a push button operable to supply power from the rechargeable battery to the illuminating apparatus.

2. The portable USB device with a rechargeable functional apparatus as claimed in claim 1, wherein the illuminating apparatus is an LED or a low power illuminator.

3. The portable USB device with a rechargeable functional apparatus as claimed in claim 2, wherein the LED is disposed at one end of the USB device and the push button is located adjacent to the LED.

* * * * *